(12) United States Patent
Park et al.

(10) Patent No.: US 12,417,881 B2
(45) Date of Patent: Sep. 16, 2025

(54) MULTILAYERED CAPACITOR AND METHOD FOR MANUFACTURING THE SAME

(71) Applicant: SAMSUNG ELECTRO-MECHANICS CO., LTD., Suwon-si (KR)

(72) Inventors: Kyeongmo Park, Suwon-si (KR); Hyung Duk Yun, Suwon-si (KR); Jeongmo Kang, Suwon-si (KR); Hoin Jun, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 138 days.

(21) Appl. No.: 18/242,841

(22) Filed: Sep. 6, 2023

(65) Prior Publication Data

US 2024/0203660 A1    Jun. 20, 2024

(30) Foreign Application Priority Data

Dec. 20, 2022 (KR) .................. 10-2022-0179230
Feb. 13, 2023 (KR) .................. 10-2023-0018667

(51) Int. Cl.
*H01G 4/30* (2006.01)
*C04B 35/468* (2006.01)
(Continued)

(52) U.S. Cl.
CPC ............. *H01G 4/30* (2013.01); *C04B 35/468* (2013.01); *C04B 35/64* (2013.01); *H01G 4/008* (2013.01); *H01G 4/012* (2013.01); *H01G 4/1227* (2013.01)

(58) Field of Classification Search
CPC .......... H01G 4/30; H01G 4/008; H01G 4/012; H01G 4/1227; C04B 35/64; C04B 35/008
See application file for complete search history.

(56) References Cited

U.S. PATENT DOCUMENTS

2008/0123248 A1* 5/2008 Kunishi .................. C25D 5/02
                                                  361/306.3
2010/0328843 A1* 12/2010 Saruban .............. H01G 4/2325
                                                  427/126.2
(Continued)

FOREIGN PATENT DOCUMENTS

JP        10-135063 A      5/1998
JP        3758293 B2       3/2006
(Continued)

OTHER PUBLICATIONS

D. Donahoe, et al., "Moisture induced degradation of multilayer ceramic capacitors," Microelectronics Reliability, vol. 46, pp. 400-408, 2006.

(Continued)

*Primary Examiner* — Michael P McFadden
(74) *Attorney, Agent, or Firm* — Morgan Lewis & Bockius LLP

(57) ABSTRACT

Disclosed is a multilayered capacitor including a capacitor body including a dielectric layer and an internal electrode, and an external electrode outside the capacitor body, wherein the external electrode includes a first layer disposed outside the capacitor body and including a conductive metal and glass, the first layer includes a glass portion disposed at a portion meeting the dielectric layer and including the glass, and the glass portion has an extended portion extending into the capacitor body along a gap between the dielectric layer and the internal electrode.

26 Claims, 12 Drawing Sheets

(51) Int. Cl.
*C04B 35/64* (2006.01)
*H01G 4/008* (2006.01)
*H01G 4/012* (2006.01)
*H01G 4/12* (2006.01)

(56) References Cited

U.S. PATENT DOCUMENTS

| | | |
|---|---|---|
| 2011/0038096 A1 | 2/2011 | Naito et al. |
| 2012/0039014 A1 | 2/2012 | Ogawa et al. |
| 2015/0016018 A1* | 1/2015 | Onishi ................. H10N 30/872 310/365 |
| 2015/0279568 A1 | 10/2015 | Saito et al. |
| 2016/0042864 A1 | 2/2016 | Hong et al. |
| 2016/0042867 A1 | 2/2016 | Kisumi |
| 2016/0087189 A1* | 3/2016 | Lee ......................... H01G 4/30 29/25.35 |
| 2016/0095223 A1* | 3/2016 | Yoshida ................. H01G 4/012 361/301.4 |
| 2016/0217930 A1* | 7/2016 | Yamaguchi .......... H01G 4/0085 |
| 2019/0131074 A1* | 5/2019 | Mizuno ................ H01G 4/0085 |
| 2020/0411247 A1* | 12/2020 | Saruban ................. H01G 4/12 |
| 2021/0098191 A1* | 4/2021 | Saito ................... H01G 4/1227 |
| 2021/0202177 A1* | 7/2021 | Kurosu ................... H01G 4/30 |
| 2022/0189696 A1* | 6/2022 | Yi .......................... H01G 4/232 |
| 2022/0208464 A1* | 6/2022 | Lee ........................ H01G 4/012 |
| 2022/0285097 A1* | 9/2022 | Iguchi .................... H01G 4/248 |
| 2022/0285098 A1* | 9/2022 | Iguchi ................. H01G 4/1227 |
| 2022/0293343 A1* | 9/2022 | Iguchi .................... H01G 4/302 |
| 2022/0293344 A1* | 9/2022 | Iguchi ................. H01G 4/1227 |

FOREIGN PATENT DOCUMENTS

| | | |
|---|---|---|
| KR | 10-0586962 B1 | 5/2006 |
| KR | 10-1200234 B1 | 11/2012 |
| KR | 10-1313699 B1 | 9/2013 |
| KR | 10-2015-0112878 A | 10/2015 |
| KR | 10-2016-0016385 A | 2/2016 |
| KR | 10-1699389 B1 | 1/2017 |

OTHER PUBLICATIONS

Saito, Yoshito, et al., "Insulation resistance degradation mechanisms of multilayer ceramic capacitors during highly accelerated temperature and humidity stress tests," Japanese Journal of Applied Physics, vol. 57, 11UC04, 2018.

Extended European Search Report issued May 23, 2024 for European Patent Application No. 23197387.6.

* cited by examiner

MULTILAYERED CAPACITOR AND METHOD FOR MANUFACTURING THE SAME

CROSS-REFERENCE TO RELATED APPLICATION

This application claims priority to and the benefit of Korean Patent Application No. 10-2023-0018667 filed in the Korean Intellectual Property Office on Feb. 13, 2023, and Korean Patent Application No. 10-2022-0179230 filed in the Korean Intellectual Property Office on Dec. 20, 2022, the entire contents of which are incorporated herein by reference.

TECHNICAL FIELD

This disclosure relates to a multilayered capacitor and a method for manufacturing the same.

BACKGROUND

Since an internal electrode material is changed into nickel (Ni) due to a price increase of Pd in the 1990s, research on causes of deteriorating moisture resistance of multilayered capacitors (MLCC) and methods of improving this has been steadily made until recently.

Nevertheless, the causes of deteriorating moisture resistance of the multilayered capacitors (MLCC) have not been clarified yet. Stability in the moisture resistance test means that the multilayered capacitors do not fail but maintain insulating properties even if the use environment is humid. Accordingly, assuming that moisture resistance characteristics are improved by blocking penetration of water molecules from the outside, methods of changing an external electrode material or a shape thereof, forming a moisture resistant film on the chip surface, and the like have been suggested.

These methods have problems of requiring an additional process and increasing a manufacturing cost. Since prices of the multilayered capacitors have steadily fallen with time after their initial development, the moisture resistance characteristics needs to be improved through as few processes as possible.

SUMMARY OF THE INVENTION

One aspect of the present disclosure provides a multilayered capacitor with improved moisture resistance characteristics by densely filling all empty spaces at a boundary where an external electrode, a dielectric layer, and an internal electrode meet one another to fundamentally block a path through which moisture may penetrate.

The multilayered capacitor according to one aspect includes a capacitor body including a dielectric layer and an internal electrode, and an external electrode outside the capacitor body, wherein the external electrode includes a first layer disposed outside the capacitor body and including a conductive metal and glass, the first layer includes a glass portion disposed at a portion meeting the dielectric layer and including the glass, and the glass portion has an extended portion extending into the capacitor body along a gap between the dielectric layer and the internal electrode.

The internal electrode may include a first alloy portion disposed at a portion meeting the first layer and including an alloy.

The first layer may not include the glass portion at a portion meeting the internal electrode.

The first alloy portion may include an alloy of the conductive metal included in the first layer and a metal included in the internal electrode.

The conductive metal may include copper (Cu).

The metal included in the internal electrode may include nickel (Ni).

The first layer may include a second alloy portion disposed at a portion meeting the internal electrode and including an alloy.

The second alloy portion may be disposed between the glass portion and another adjacent glass portion.

The extended portion of the glass portion may be disposed between the first alloy portion and the dielectric layer.

The glass portion may cover an end of the dielectric layer.

The dielectric layer may include a glass diffusion region in which glass is diffused into the dielectric layer.

The extended portion of the glass portion may be disposed between the first alloy portion and the glass diffusion region of the dielectric layer.

The glass may include an oxide including barium (Ba), silicon (Si), boron (B), zinc (Zn), calcium (Ca), and aluminum (Al).

In the glass, a weight ratio of barium (Ba) (wt % of barium (Ba) to the total weight of the glass) may be greater than a weight ratio of silicon (Si) (wt % of silicon (Si) to the total weight of the glass).

In the glass, the weight ratio of barium (Ba) may be more than twice as large as the weight ratio of silicon (Si).

The dielectric layer may include greater than or equal to about 0.2 mol and less than about 1 mol of Tb based on 100 mol of $BaTiO_3$.

The external electrode may further include a second layer disposed outside the first layer and including a resin and a conductive metal.

The external electrode may further include a third layer disposed outside the first layer and including a plated metal.

A method of manufacturing a multilayered capacitor includes forming a conductive paste layer that becomes an internal electrode after firing, on the surface of the dielectric green sheet, which becomes the dielectric layer after firing, stacking the dielectric green sheets on which the conductive paste layer is formed to manufacture a dielectric green sheet stack, firing the dielectric green sheet stack to manufacture a capacitor body, and coating a conductive paste including a conductive metal and a glass frit on the outside of the capacitor body and then sintering the resultant at about 700° C. to about 1000° C. to form an external electrode including a first layer, wherein the first layer includes a glass portion disposed at a portion meeting the dielectric layer and including a glass frit, and the glass portion has an extended portion extending into the capacitor body along a gap between the dielectric layer and the internal electrode.

The glass frit may be a first glass frit including about 23.2 mol % to about 33.2 mol % of BaO, about 2.2 mol % to about 12.2 mol % of $SiO_2$, about 19 mol % to about 29 mol % of $B_2O_3$, about 23.3 mol % to about 33.3 mol % of $ZnO_2$, about 3.6 mol % to about 13.6 mol % of CaO, and about 0 mol % to about 8.8 mol % of $Al_2O_3$.

The glass frit may be a second glass frit including about 32.3 mol % to about 42.3 mol % of BaO, about 4.5 mol % to about 14.5 mol % of $SiO_2$, about 26.8 mol % to about 36.8 mol % of $B_2O_3$, about 0 mol % to about 10 mol % of $ZnO_2$, about 6.3 mol % to about 16.3 mol % of CaO, and about 0 mol % to about 5 mol % of $Al_2O_3$.

The glass frit may include the first glass frit and the second glass frit in a volume ratio of about 1:0.1 to about 1:100.

According to the multilayered capacitor according to one aspect, the moisture resistance characteristics thereof may be improved by densely filling all the empty spaces at the boundary where the external electrode, the dielectric layer, and the internal electrode meet one another to fundamentally block the path through which moisture may penetrate.

DETAILED DESCRIPTION OF THE EMBODIMENTS

Figure 1:
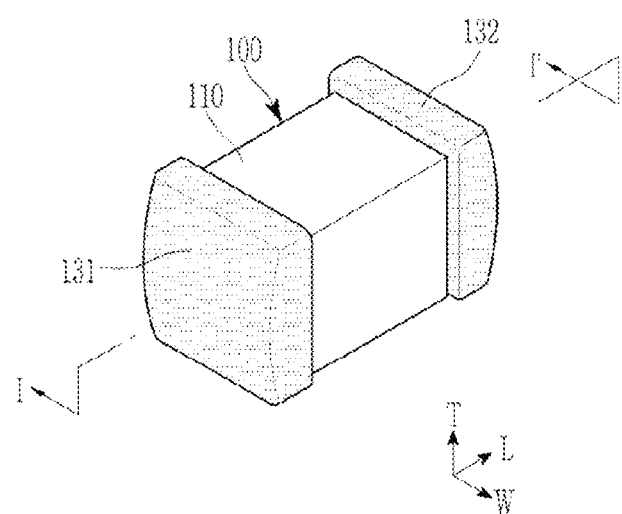
FIG. 1 is a perspective view illustrating a multilayered capacitor according to an embodiment.

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. Further, the accompanying drawings are provided only in order to allow embodiments disclosed in the present specification to be easily understood, and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected" or "coupled" to another constituent element, it may be connected or coupled directly to the other constituent element or may be connected or coupled to the other constituent element with a further constituent element intervening therebetween. In contrast, it should be understood that, when it is described that an element is "directly coupled" or "directly connected" to another element, no element is present between the element and the other element.

Throughout the specification, it should be understood that the term "include," "comprise," "have," or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

Figure 2:
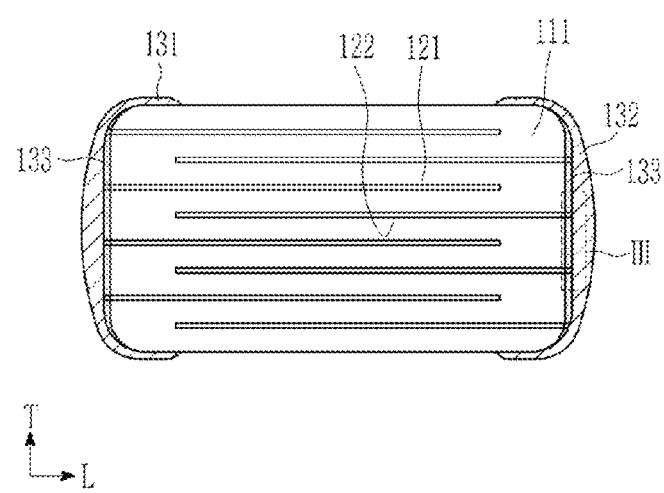
FIG. 2 is a cross-sectional view of the multilayered capacitor taken along line I-I' of FIG. 1.
Figure 3:
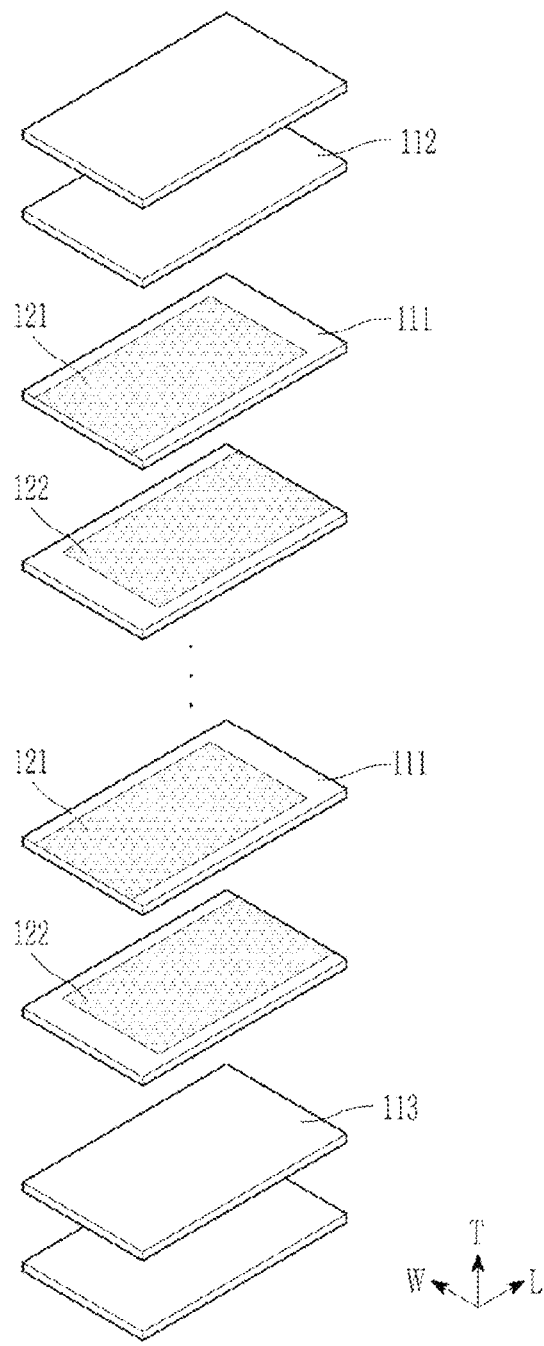
FIG. 3 is an exploded perspective view illustrating a stacked structure of internal electrodes in the capacitor body of FIG. 1

FIG. 1 is a perspective view illustrating a multilayered capacitor 100 according to an embodiment, FIG. 2 is a cross-sectional view of the multilayered capacitor 100 taken along line I-I' of FIG. 1, and FIG. 3 is an exploded perspective view illustrating a stacked structure of internal electrodes in the capacitor body 110 of FIG. 1.

When directions are defined to clearly describe the present embodiment, the L-axis, W-axis, and T-axis indicated in the drawings represent the longitudinal direction, the width direction, and the thickness direction of the capacitor body 110, respectively. Herein, the thickness direction (T-axis direction) may be a direction perpendicular to the wide surface (main surface) of the sheet-shaped components, and may be, for example, used in the same concept as the stacking direction in which the dielectric layers 111 are stacked. The longitudinal direction (L-axis direction) may be a direction substantially perpendicular to the thickness direction (T-axis direction) in a direction extending parallel to the wide surface (main surface) of the sheet-shaped components, and may be, for example, a direction in which the first and second external electrodes 131 and 132 are disposed. The width direction (W-axis direction) may be a direction that extends parallel to the wide surface (main surface) of the sheet-shaped components and is substantially perpendicular to the thickness direction (T-axis direction), and the length of the sheet-like components in the longitudinal direction (L-axis direction) may be longer than the length in the width direction (W-axis direction).

Referring to FIGS. 1 to 3, the multilayered capacitor 100 according to the present embodiment may include the capacitor body 110, and first and second external electrodes 131 and 132 disposed at both ends of the capacitor body 110 which face each other in the longitudinal direction (L-axis direction).

The capacitor body 110 may have, for example, a substantially hexahedral shape.

In this embodiment, for convenience of explanation, in the capacitor body 110, surfaces opposite to each other in the thickness direction (T-axis direction) are defined as first and second surfaces, surfaces connected to the first and second surfaces and facing each other in the longitudinal direction (L-axis direction) are defined as third and fourth surfaces, and surfaces connected to the first and second surfaces, connected to the third and fourth surfaces, and facing each other in the width direction (W-axis direction) are defined as fifth and sixth surfaces. For example, the first surface, which is a lower surface, may be a surface facing the mounting direction.

The shape and dimensions of the capacitor body 110 and the number of stacked dielectric layers 111 are not limited to those shown in the drawings of the present embodiment.

The capacitor body 110 is formed by stacking a plurality of the dielectric layers 111 in the thickness direction (T-axis direction) and then firing them, and includes a plurality of dielectric layers 111, and a plurality of first and second internal electrodes 121 and 122 which are alternately disposed in a thickness direction (T-axis direction) with the dielectric layers 111 interposed therebetween. In this case, the first and second internal electrodes 121 and 122 may have different polarities.

Herein, the boundary between the respective dielectric layers 111 adjacent to each other of the capacitor body 110 may be integrated to the extent that it is difficult to check without using a scanning electron microscope (SEM).

Also, the capacitor body 110 may include an active region and cover regions 112 and 113.

The active region contributes to generating a capacitance of the multilayered capacitor 100. For example, the active region may be a region in which the first and second internal electrodes 121 and 122 are stacked and overlapped with each other along the thickness direction (T-axis direction).

The cover regions 112 and 113 may be respectively disposed on the first and second surfaces of the active region in the thickness direction (T-axis direction) as margin portions. The cover regions 112 and 113 may be formed by stacking a single dielectric layer 111 or two or more dielectric layers 111 on an upper surface and a lower surface of the active region, respectively.

In addition, the capacitor body 110 may further include a side cover region. The side cover region is a margin portion, and may be respectively disposed on the fifth and sixth surfaces of the active region in the width direction (W-axis direction). Such side cover regions may be formed by coating a conductive paste layer for forming internal electrodes on the surface of the dielectric green sheet only to a portion of the surface of the dielectric green sheet, stacking dielectric green sheets to which a conductive paste layer is not applied on both side surfaces of the dielectric green sheet, and firing the same.

The cover regions 112 and 113 and the side cover regions serve to prevent damage to the first and second internal electrodes 121 and 122 due to physical or chemical stress.

For example, the dielectric layer 111 may include a ceramic material having a high dielectric constant. For example, the ceramic material may include a dielectric ceramic containing components such as $BaTiO_3$, $CaTiO_3$, $SrTiO_3$, or $CaZrO_3$, and the like. In addition, auxiliary components such as a Mn compound, an Fe compound, a Cr compound, a Co compound, and a Ni compound may be further included in addition to these components. For example, $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which Ca, Zr, etc. are partially dissolved in $BaTiO_3$-based dielectric ceramics.

In addition, a ceramic powder, a ceramic additive, an organic solvent, a plasticizer, a binder, a dispersant, and the like may be further added to the dielectric layer 111. The ceramic additive may include, for example, transition metal oxide or transition metal carbide, a rare earth element, magnesium (Mg), or aluminum (Al), and the like.

For example, an average thickness of the dielectric layer 111 may be about 0.5 μm to about 10 μm.

The first and second internal electrodes 121 and 122 are electrodes having different polarities, and are alternately disposed to face each other along the thickness direction (T-axis direction) with the dielectric layer 111 interposed therebetween, and one end thereof may be exposed through the third and fourth surfaces of the capacitor body 110.

The first and second internal electrodes 121 and 122 may be electrically insulated from each other by the dielectric layer 111 disposed in the middle.

Ends of the first and second internal electrodes 121 and 122 alternately exposed through the third and fourth surfaces of the capacitor body 110 are connected to the first and second external electrodes 131 and 132, respectively, to be electrically connected.

The first and second internal electrodes 121 and 122 may include a conductive metal, for example, a metal such as Ni, Cu, Ag, Pd, or Au, an alloy thereof, for example an Ag—Pd alloy.

Also, the first and second internal electrodes 121 and 122 may include dielectric particles having the same composition as the ceramic material included in the dielectric layer 111.

The first and second internal electrodes 121 and 122 may be formed using a conductive paste containing a conductive metal. As a method of printing the conductive paste, a screen-printing method or a gravure printing method or the like may be used.

For example, each average thickness of the first and second internal electrodes 121 and 122 may be about 0.1 μm to about 2 μm.

The first and second external electrodes 131 and 132 are supplied with voltages of different polarities, and are electrically connected to exposed portions of the first and second internal electrodes 121 and 122, respectively.

According to the above configuration, when a predetermined voltage is applied to the first and second external electrodes 131 and 132, charges are accumulated between the first and second internal electrodes 121 and 122. At this time, a capacitance of the multilayered capacitor 100 is proportional to an overlapping area of the first and second internal electrodes 121 and 122 overlapping each other along the T-axis direction in the active region.

The first and second external electrodes 131 and 132 may respectively include a first connection portion and a second connection portion disposed on the third and fourth surfaces of the capacitor body 110 and connected to the first and second internal electrodes 121 and 122, and may also include a first band portion and a second band portion disposed at each corner where the first and second surfaces and the third and fourth surfaces of the capacitor body 110 meet.

The first and second band portions may extend from the first and second connection portions to portions of the first and second surfaces of the capacitor body 110, respectively. The first and second band portions may respectively further extend from the first and second connection portions to the portions of the fifth and sixth surfaces of the capacitor body 110. The first and second band portions may serve to improve adhesion strength of the first and second external electrodes 131 and 132.

Figure 4:
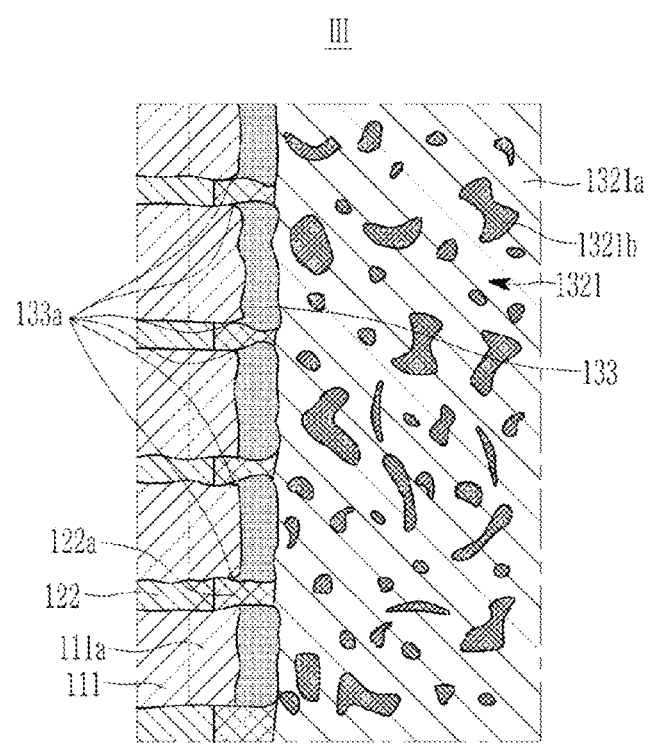
FIG. 4 is an enlarged cross-sectional view of the region III of FIG. 2.

FIG. 4 is an enlarged cross-sectional view of the region III of FIG. 2 to schematically show a bonding boundary region between the second external electrode 132 and the capacitor body 110. FIG. 4 shows the second external electrode 132 alone, but the first external electrode 131 also has similar characteristics to those of the second external electrode 132 shown in FIG. 4. Hereinafter, referring to FIG. 4, the first and second external electrodes 131 and 132 of the present example embodiment are illustrated in detail.

The first and second external electrodes 131 and 132 include a first layer 1321 including a conductive metal 1321a and glass 1321b. The first layer 1321 of the first and second external electrodes 131 and 132 may be disposed in contact with outer surfaces (third and fourth surfaces) of the capacitor body 110.

The first and second external electrodes 131 and 132 may be composed of a single electrode layer or formed by stacking a plurality of electrode layers. For example, when the first and second external electrodes 131 and 132 are composed of the plurality of electrode layers, the first and second external electrodes 131 and 132 may include a first layer 1321 contacting the capacitor body 110 and a second layer, and/or a third layer disposed to cover the first layer 1321.

The glass 1321b may be a mixture of a glass component composed of $SiO_2$ and another glass component composed of $B_2O_3$—BaO—ZnO, for example, $Ba_3Zn(BO_3)_2$. In addition, the glass 1321b may further include trace elements in addition to the aforementioned main elements (B, Si, Ba, Zn, O). The trace elements may include, for example, Al, a rare earth element, Zr, Mn, Ca, Mg, Ti, K, or Na. A total content of the trace elements may be less than or equal to about 0.20 parts by mole based on 1.0 part by mole of a total content of the main elements excluding oxygen (O).

For example, the glass 1321b may include oxides including barium (Ba), silicon (Si), boron (B), zinc (Zn), calcium (Ca), and aluminum (Al).

Herein, the glass 1321b may have a larger weight ratio of the barium (Ba) than that of the silicon (Si). Herein, the weight ratio of the barium (Ba) may be wt % of the barium (Ba) based on a total weight of the glass 1321b, and the weight ratio of the silicon (Si) wt % of the silicon (Si) based on the total weight of the glass 1321b. For example, in the glass 1321b, the weight ratio of the barium (Ba) may be at least twice, at least three times, or at least four times larger than that of the silicon (Si).

In addition, the glass 1321b may include the boron (B) in a larger weight ratio than that of the silicon (Si). Herein, the weight ratio of the boron (B) may be wt % of the boron (B) to the total weight of the glass 1321b. For example, in the glass 1321b, the weight ratio of the boron (B) may be at least twice or at least three times larger than that of the silicon (Si).

In addition, in the glass 1321b, a weight ratio of zinc (Zn) may be larger than that of the silicon (Si). Herein, the weight ratio of the zinc (Zn) may be wt % of the zinc (Zn) to the total weight of the glass 1321b. For example, in the glass 1321b, the weight ratio of the zinc (Zn) may be at least twice, at least three times, or at least four times larger than that of the silicon (Si). Optionally, in the glass 1321b, the weight ratio of the zinc (Zn) may be smaller than that of the silicon (Si).

In addition, the glass 1321b may not include strontium (Sr).

When the glass 1321b has such a composition, the glass 1321b secures excellent fluidity and wetting and thus reacts with the ceramic material of the dielectric layer 111 to form a glass portion 133 where the first layer 1321 of the first and second external electrodes 131 and 132 meets the dielectric layer 111 and also penetrates into an empty space between the dielectric layer 111 and the first and second internal electrodes 121 and 122 to form an extended portion 133a of the glass portion 133.

Herein, the dielectric layer 111 may include greater than or equal to about 0.2 mol and less than about 1 mol of Tb based on 100 mol of $BaTiO_3$. When the dielectric layer 111 further includes Tb, the wetting of the dielectric layer 111 by the glass 1321b may be improved, so that the glass 1321b may penetrate into the empty spaces between the dielectric layer 111 and the first and second internal electrodes 121 and 122 to much better form the extended portion 133a of the glass portion 133.

A boundary portion where the first and second external electrodes 131 and 132, the dielectric layer 111, and the first and second internal electrodes 121 and 122 meet one another is a portion where pores or defects are more easily generated due to different characteristics of each material. When water molecules penetrate through these pores and defects into the inside of the dielectric layer 111, insulation resistance may be reduced, resulting in deteriorating the moisture resistance characteristics.

As described above, the glass 1321b densely fills all the empty spaces acting as the defects in the boundary layer where the metals of the first and second internal electrodes 121 and 122 meet the ceramic material of the dielectric layer 111 to fundamentally block a path through which moisture penetrates and thus improve the moisture resistance characteristics.

The glass portion 133 and the extended portion 133a of the first layer 1321 may be analyzed by taking an image of one cross-section of the multilayered capacitor 100 cut perpendicularly to the width direction (W-axis direction), for example, a cross-section cut in the longitudinal direction (L-axis direction) and thickness direction (T-axis direction) perpendicular to the width direction (W-axis direction) at the center (½ point) of the width direction with a scanning electron microscope (SEM) or a scanning transmission electron microscope (STEM). For example, a composition of the conductive metal 1321a or the glass 1321b may be measured through a component analysis by using an electron beam microanalyzer (EPMA) during the cross-section examination. The component analysis may be performed by obtaining measurements at at least 3 points and calculating an average thereof. When the electron beam microanalyzer (EPMA) is used to perform the component analysis and the like, an X-ray spectrometer such as EDS (energy dispersive spectrometer), WDS (wavelength dispersive spectrometer), or the like may be used.

In addition, an area ratio of the conductive metal 1321a may be measured through an image analysis of the cross-section photograph by examining the cross-section with SEM, STEM, or the like. When the cross-section of the first layer 1321 is examined through a reflection electron image of SEM, an HAADF image of STEM, or the like, the conductive metal 1321a having a metallic bond may be recognized as a bright portion in contrast, and a non-metal component (including other pores and oxides) of the glass 1321b may be recognized as a dark portion in the contrast. Accordingly, the area ratio of the conductive metal 1321a in the cross-section of the first layer 1321 may be calculated as an area ratio of the bright portion in the contrast to a total area of the entire measurement field by binarizing the cross-section photograph. In addition, the measurement may be performed in at least about 5 or more areas, and an average thereof may be calculated.

As shown in FIG. 4, the glass portion 133 may be disposed where the first layer 1321 meets the dielectric layer 111. When the glass portion 133 is disposed at an end of the dielectric layer 111 in the L-axis direction, and when the first layer 1321 is formed over portions of the first and second surfaces or the fifth and sixth surfaces from the third and fourth surfaces, the glass portion 133 may also be disposed even in the portions of the first and second surfaces or the fifth and sixth surfaces.

The glass portion 133 may not be disposed at a portion where the external electrodes meet the first and second internal electrodes 121 and 122. In other words, the first and second internal electrodes 121 and 122 are exposed through the glass portion 133 to the third and fourth surfaces, and the exposed ends of the first and second internal electrodes 121 and 122 may be electrically connected to the first layer 1321 of the first and second external electrodes 131 and 132. However, when the surfaces in the T-axis direction and the W-axis direction is examined in the L-axis direction, on the third or fourth surface of the capacitor body 110, the glass portion 133 may cover a portion of the ends of the first and second internal electrodes 121 and 122 in the L-axis direction. In addition, a portion of the conductive metal 1321a of the first layer 1321 may be disposed inside the glass portion 133, wherein the glass portion 133 and the glass 1321b included in the first layer 1321 may have an unclear bonding boundary.

For example, an average length (average thickness) of the glass portion 133 in the L-axis direction may be about 1 μm to about 10 μm, for example, about 3 μm to about 8 μm.

The glass portion 133 may have an extended portion 133a extending into the capacitor body 110 along a gap between the dielectric layer 111 and the first and second internal electrodes 121 and 122. However, all of the glass portion 133 has no extended portion 133a, and only a portion of the glass portion 133 may have the extended portion 133a.

For example, the extended portion 133a of the glass portion 133 may be formed by the glass 1321b of the first layer 1321 which penetrates and fills empty spaces such as pores, defects, or the like due to different characteristics of each material where the first and second external electrodes 131 and 132, the dielectric layer 111, and the first and second internal electrodes 121 and 122 meet one another. Accordingly, when examined on one cross-section of the multilayered capacitor 100 perpendicular to the W-axis direction, the extended portion 133a of the glass portion 133 may exhibit penetration at an end of the glass portion 133 in the T-axis direction along a gap between the dielectric layer 111 and the first and second internal electrodes 121 and 122.

The glass portion 133, which is disposed where the first layer 1321 meets the dielectric layer 111 and has the extended portion 133a extending inside the capacitor body 110 along a gap between the dielectric layer 111 and the first and second internal electrodes 121 and 122, may wrap the end of the dielectric layer 111. For example, on the third and fourth surfaces of the capacitor body 110, the end of the dielectric layer 111 between the first and second internal electrodes 121 and 122 in the L-axis direction and the corner thereof may be substantially covered by the glass portion 133. Accordingly, when the surfaces of the T-axis direction and the W-axis direction are viewed from the L-axis direction, the dielectric layer 111 disposed between first and second internal electrodes 121 and 122 may not be exposed between the glass portions 133.

On the other hand, the conductive metal 1321a of the first layer 1321 may include copper (Cu), nickel (Ni), silver (Ag), palladium (Pd), gold (Au), platinum (Pt), tin (Sn), tungsten (W), titanium (Ti), lead (Pb), an alloy thereof, or a combination thereof, for example, the copper (Cu) may include a copper (Cu) alloy. When the conductive metal 1321a includes the copper, the other metals excluding the copper may be included in an amount of about 5 parts by mole based on 100 parts by mole of the copper.

In the first layer 1321, the contents of the conductive metal 1321a and the glass 1321b are not particularly limited, but the conductive metal 1321a may for example, have an average area ratio of about 30% to about 90% or about 70% to about 90% to an unit area of the first layer 1321 on the cross-section cut in the L-axis direction and T-axis direction perpendicular to the W-axis direction at the center (½ point) of the W-axis direction of the multilayered capacitor 100.

Herein, in the SEM or STEM cross-section photograph, etc., the average area ratio of the conductive metal 1321a may be measured in a unit area of a width of about 1 μm to about 100 μm and a length of about 1 μm to about 100 μm, for example, about 10 μm×about 2 μm in the first layer 1321. The unit area may be disposed at any position in the first layer 1321, for example, the first and second connection portions of the first layer 1321, the first and second band portions, and the edges therebetween. However, all the unit areas may be disposed in the first layer 1321. The average area ratio of the conductive metal 1321a may be an arithmetic mean of a plurality of unit areas of the conductive metal 1321a in the first layer 1321, for example, an arithmetic mean of the area ratios of the conductive metal 1321a which are measured from unit areas of the first and second connection portions, the first and second band portions, and the edges therebetween.

The first and second internal electrodes 121 and 122 may include a first alloy portion 122a where to meet the first layer 1321. The first alloy portion 122a may be disposed at the end of the first and second internal electrodes 121 and 122 in the L-axis direction.

The first alloy portion 122a may include an alloy of the conductive metal 1321a included in the first layer 1321 and the metals included in the first and second internal electrodes 121 and 122. For example, when the conductive metal 1321a of the first layer 1321 includes copper (Cu), and the first and second internal electrodes 121 and 122 include nickel (Ni), the first alloy portion 122a may include an alloy of the copper (Cu) and the nickel (Ni). The first alloy portion 122a includes the alloy of the conductive metal 1321a included in the first layer 1321 and the metal included in the first and second internal electrodes 121 and 122 and thus forms a denser structure to prevent moisture penetration and thus further improve the moisture resistance characteristics.

The first alloy portion 122a includes no alloy alone but further includes the conductive metal 1321a included in the first layer 1321 and the metal included in the first and second internal electrodes 121 and 122. In the first alloy portion 122a, each content of the alloy, the conductive metal 1321a of the first layer 1321, and the metal included in the first and second internal electrodes 121 and 122 may be changed. In other words, the first alloy portion 122a may include more the metal included in the first and second internal electrodes 121 and 122 where to be closer to the inside of the capacitor body 110 in the L-axis direction but more the conductive metal 1321a included in the first layer 1321 where to be closer to the first layer 1321, wherein the contents thereof may gradually change with a concentration gradient. Accordingly, a boundary of the metals included in the first alloy portion 122a and the first and second internal electrodes 121 and 122 or a boundary between the first alloy portion 122a and the first layer 1321 may be unclear. However, the first alloy portion 122a may be classified into a region including the conductive metal 1321a and the metals included in the first and second internal electrodes 121 and 122 over the first and second internal electrodes 121 and 122 and the first layer 1321.

A region in which the first alloy portion 122a is diffused into the first layer 1321 may be defined as a second alloy portion. Accordingly, the first layer 1321 may include a second alloy portion disposed where the first layer 1321 meets the internal electrodes 121 and 122 and including the alloy. For example, the second alloy portion may be disposed between the glass portion 133 and another neighboring glass portion 133 and further diffused toward the first layer 1321 beyond the glass portion 133 in the L-axis direction, and when the surfaces in the T-axis direction and the W-axis direction are viewed in the L-axis direction, a portion of the second alloy portion may cover the end of the glass portion 133 in the L-axis direction on the third or fourth surfaces of the capacitor body 110.

For example, from one end of the first and second internal electrodes 121 and 122 in the L-axis direction to the inside of the capacitor body 110, the first alloy portion 122a may have a L-axis direction length of about 0.5 μm to about 5 μm. Herein, the one end of the first and second internal electrodes 121 and 122 in the L-axis direction may be, for example, defined by a boundary of the dielectric layer 111 disposed adjacent to the first and second internal electrodes 121 and 122 with the glass portion 133.

When the first alloy portion 122a is present, for example, the extended portion 133a of the glass portion 133 may be disposed between the first alloy portion 122a and the dielectric layer 111. The first alloy portion 122a may prevent moisture penetration by forming a more dense structure as the alloy of the conductive metal 1321a included in the first layer 1321 and the metals included in the first and second internal electrodes 121 and 122 to prevent moisture penetration, and the extended portion 133a of the glass portion 133 may further improve the moisture resistance characteristics by densely filling empty spaces at the boundary layer where the metals of the first and second internal electrodes 121 and 122 meet the ceramic material of the dielectric layer 111 and thus fill the empty space acting as defects, fundamentally blocking a path through which moisture may penetrate.

The dielectric layer 111 may further include a glass diffusion region 111a in which the glass 1321b is diffused into the dielectric layer 111. The glass diffusion region 111a may be disposed at the end of the dielectric layer 111 in the L-axis direction, for example, where the dielectric layer 111 meets the glass portion 133 of the first layer 1321.

For example, the glass diffusion region 111a may have a structure that the glass 1321b penetrates into the empty spaces between crystalline grains of the ceramic material, thereby blocking a path through which moisture penetrates into the dielectric layer 111 and further improving the moisture resistance characteristics.

In the glass diffusion region 111a, contents of the ceramic material and the glass 1321b may be changed. In other words, in the glass diffusion region 111a, the content of the glass 1321b may decrease from a side of the glass diffusion region 111a closer to the glass portion 133 to a direction farther away from the glass portion 133, that is, toward the inside direction of the capacitor body 110, for example, gradually decreases with a concentration gradient. Accordingly, the glass diffusion region 111a and the glass portion 133 may have an unclear boundary. However, the glass diffusion region 111a may be classified into a region including a mixture of the ceramic material of the dielectric layer 111 with the glass 1321b.

For example, from one end of the dielectric layer 111 in the L-axis direction toward the inside of the capacitor body 110, the glass diffusion region 111a may have a L-axis direction length of about 0.5 μm to about 5 μm. Herein, one end of the glass diffusion region 111a in the L-axis direction may be for example defined by the boundary of the dielectric layer 111 and the glass portion 133 of the first layer 1321.

When the glass diffusion region 111a is present, the extended portion 133a of the glass portion 133 may be disposed between the first alloy portion 122a and the glass diffusion region 111a. The glass diffusion region 111a may fill the empty spaces between crystalline grains of the ceramic material to block a path through which moisture penetrates into the inside of the dielectric layer 111, the first alloy portion 122a includes the alloy of the conductive metal 1321a of the first layer 1321 and the metals of the first and second internal electrodes 121 and 122 to form a more dense structure and thus block the moisture penetration, and the extended portion 133a of the glass portion 133 may densely fill the empty spaces between the first alloy portion 122a and the glass diffusion region 111a to fill all the empty spaces possibly acting as defects and thus fundamentally block the path, ultimately further improving the moisture resistance characteristics.

For example, the first layer 1321 may be formed in a method of dipping the capacitor body 110 in a conductive paste including a conductive metal 1321a and glass 1321b, printing the conductive paste on the surface of the capacitor body 110 through screen printing, gravure printing, or the like, and coating the conductive paste on the surface of the capacitor body 110 or transferring a dry film formed by drying the conductive paste onto the capacitor body 110.

The first layer 1321 is formed of the aforementioned conductive paste and thus may increase density of the first and second external electrodes 131 and 132 due to the glass 1321b added thereto as well as maintain sufficient conductivity, and thereby effectively suppress penetration of a plating solution and/or external moisture.

As described herein, the first and second outer electrodes 131 and 132 may be configured by stacking a plurality of electrode layers, and may further include, for example, a second layer and/or a third layer disposed to cover the first layer 1321.

The second layer may be formed on the first layer 1321 and for example the second layer may completely cover the first layer 1321.

The second layer may include a base resin and a conductive metal 1321a including copper (Cu), silver (Ag), nickel (Ni), or a mixture thereof.

The base resin included in the second layer is not particularly limited as long as it has bondability and impact absorption. The base resin may be mixed with the conductive metal powder to form a paste, and may include, for example, an epoxy resin.

The conductive metal included in the second layer is not particularly limited as long as it is a material that can be electrically connected to the first layer 1321, and may include, for example, copper (Cu), silver (Ag), nickel (Ni), or a mixture thereof.

The second layer extend to the first and second surfaces of the capacitor body 110. The length of the region where the second layer is extended to the first and second surfaces of the capacitor body 110 may be longer than the length of the region where the first layer 1321 is extended to the first and second surfaces of the capacitor body 110. That is, the second layer may be formed on the first layer 1321, and completely cover the first layer 1321.

The third layer may include nickel (Ni) as a main component, and may further include copper (Cu), tin (Sn), palladium (Pd), platinum (Pt), gold (Au), silver (Ag), tungsten (W), titanium (Ti), or lead (Pb) alone or as an alloy thereof. The third layer may improve mountability of the multilayered capacitor 100 on a board, structural reliability, external durability, heat resistance, and equivalent series resistance (ESR).

For example, the third layer may be formed through plating. The third layer may be formed through sputtering or electroplating (electric deposition).

A method of manufacturing a multilayered capacitor according to another embodiment includes forming a layer of conductive paste on a surface of a dielectric green sheet, stacking the dielectric green sheet to produce a dielectric green sheet stack, firing the dielectric green sheet stack to produce a capacitor body, and forming an external electrode outside the capacitor body.

First, the manufacturing of the capacitor body is described.

In the manufacturing process of the capacitor body, a dielectric paste to become the dielectric layer after firing and a conductive paste to become the internal electrode after firing are prepared.

The dielectric paste is prepared, for example, by the following method. Ceramic materials are uniformly mixed by means such as wet mixing, dried, and heat-treated under predetermined conditions to obtain calcined powder. To the obtained calcined powder, an organic vehicle or an aqueous vehicle is added and kneaded to prepare a dielectric paste.

A dielectric green sheet is obtained by forming the obtained dielectric paste into a sheet by a doctor blade method or the like. In addition, the dielectric paste may include an additive selected from various dispersants, plasticizers, dielectrics, subcomponent compounds, or glass as needed.

Conductive paste for the internal electrode is prepared by kneading conductive powder made of a conductive metal or an alloy thereof with a binder or a solvent. The conductive paste for the internal electrode may include ceramic powder (for example, barium titanate powder) as a co-material, if necessary. The co-material may act to suppress sintering of the conductive powder during the firing process.

On the surface of the dielectric green sheet, the conductive paste for an internal electrode is coated in a predetermined pattern by various printing methods such as screen printing or a transfer method. After stacking a plurality of layers of dielectric green sheets on which internal electrode patterns are formed, a dielectric green sheet stack is obtained by pressing in the stacking direction. At this time, the dielectric green sheets and internal electrode patterns may be stacked so that the dielectric green sheets may be disposed on the upper and lower surfaces of the dielectric green sheet stack in the stacking direction.

Optionally, the obtained dielectric green sheet stack may be cut into predetermined dimensions by dicing or the like.

In addition, the dielectric green sheet stack may be solidified and dried to remove the plasticizer, etc. and barrel-polished by using a centrifugal barrel machine or the like after the solidification-drying. In the barrel polishing, the dielectric green sheet stack is put with a medium and a polishing liquid into a barrel container, and then the barrel container is applied with rotational motion or vibration to polish unnecessary parts such as burrs and the like generated during the cutting. In addition, after the barrel polishing, the dielectric green sheet stack is washed with a cleaning solution such as water and the like and dried.

The dielectric green sheet stack is treated to remove the binder and fired, obtaining the capacitor body.

The binder removal may be performed under conditions appropriately adjusted according to a main component composition of the dielectric layer or a main component composition of the internal electrode. For example, the binder removal may be performed by increasing a temperature at about 5° C./hr to about 300° C./hr and maintaining a temperature in a range from about 180° C. to about 400° C. for a period of time in a range from about 0.5 hours to about 24 hours. The binder removal may be performed under an air atmosphere or a reducing atmosphere.

The firing treatment may be performed under conditions appropriately adjusted according to the main component composition of the dielectric layer or the main component composition of the internal electrode. For example, the firing may be performed at a temperature in a range from about 1200° C. to about 1350° C. or in a range from about 1220° C. to about 1300° C. for a period of time in a range from about 0.5 hours to about 8 hours or in a range from about 1 hour to about 3 hours. The firing may be performed under a reducing atmosphere, for example, an atmosphere in which a mixed gas of nitrogen gas ($N_2$) and hydrogen gas ($H_2$) is humidified. When the internal electrode includes nickel (Ni) or a nickel (Ni) alloy, an oxygen partial pressure may be in a range from about $1.0 \times 10^{-14}$ MPa to about $1.0 \times 10^{-10}$ MPa under the firing atmosphere.

After the firing treatment, annealing may be performed, if needed. The annealing is performed for re-oxidizing the dielectric layer, and when the firing is performed under a reducing atmosphere, the annealing may be performed. The annealing may be performed under conditions appropriately adjusted according to the main component composition and the like of the dielectric layer. For example, the annealing may be performed at a temperature in a range from about 950° ° C. to about 1150° C. for a period of time in a range from about 0 hour to about 20 hours by increasing the temperature at a rate in a range from about 50° C./hour to about 500° C./hour. The annealing may be performed under a humid nitrogen gas ($N_2$) atmosphere, wherein an oxygen partial pressure may be in a range from about $1.0 \times 10^{-9}$ MPa to about $1.0 \times 10^{-5}$ MPa.

In the binder removal treatment, the firing treatment, or the annealing treatment, in order to humidify nitrogen gas, mixed gas, or the like, a wetter or the like may be for example, used, wherein a water temperature may be in a range from about 5° C. to about 75° C. The binder removal treatment, the firing treatment, and the annealing treatment may be performed continuously or independently.

Optionally, the third and fourth surfaces of the obtained capacitor body may be surface-treated through sandblasting, laser irradiation, barrel polishing, or the like. This surface treatment may expose the ends of the internal electrode on the outer surfaces of the third and fourth surfaces, thereby improving the electrical connection of the external and internal electrodes and easily forming the first alloy portion.

On the outer surface of the capacitor body, a paste for a first layer of the external electrode may be coated and sintered to form a first layer and simultaneously a glass portion at a portion where the first layer meets the dielectric layer. During this process, an alloy layer is also formed as the conductive metal included in the first layer meets the metal included in the inner metal.

The paste for the first layer may include a conductive metal and glass frit.

The descriptions of conductive metals are the same as above, and will not be repeatedly illustrated.

The glass frit may be a mixture of a glass component consisting of $SiO_2$ and a glass component consisting of $B_2O_3$—BaO—ZnO, for example $Ba_3Zn(BO_3)_2$. In addition to the major elements (B, Si, Ba, Zn, O) described above, the glass frits may contain additional trace elements. The trace elements may include, for example, Al, rare earth elements, Zr, Mn, Ca, Mg, Ti, K, or Na. A total content of trace elements may be less than or equal to about 0.20 parts per million based on a total content of major elements of 1.0 part per million, excluding oxygen (O).

For example, the glass frit may be a first glass frit including about 23.2 mol % to about 33.2 mol % of BaO, about 2.2 mol % to about 12.2 mol % of $SiO_2$, about 19 mol % to about 29 mol % of $B_2O_3$, about 23.3 mol % to about 33.3 mol % of $ZnO_2$, about 3.6 mol % to about 13.6 mol % of CaO, and about 0 mol % to about 8.8 mol % of $Al_2O_3$. The first glass frit may include about 25.7 mol % to about 30.7 mol % of BaO, about 4.7 mol % to about 9.7 mol % of $SiO_2$, about 21.5 mol % to about 26.5 mol % of $B_2O_3$, about 25.8 mol % to about 30.8 mol % of $ZnO_2$, about 6.1 mol % to about 11.1 mol % of CaO, and about 1.3 mol % to about 6.3 mol % of $Al_2O_3$, or about 27.2 mol % to about 29.2 mol % of BaO, about 6.2 mol % to about 8.2 mol % of $SiO_2$, about 23 mol % to about 25 mol % of $B_2O_3$, about 27.3 mol % to about 29.3 mol % of $ZnO_2$, and about 7.6 mol % to about 9.6 mol % of CaO, and about 2.8 mol % to about 4.8 mol % of $Al_2O_3$.

Or, the glass frit may be a second glass frit including about 32.3 mol % to about 42.3 mol % of BaO, about 4.5 mol % to about 14.5 mol % of $SiO_2$, about 26.8 mol % to about 36.8 mol % of $B_2O_3$, about 0 mol % to about 10 mol % of $ZnO_2$, about 6.3 mol % to about 16.3 mol % of CaO, and about 0 mol % to about 5 mol % of $Al_2O_3$. The second glass frit may include about 34.8 mol % to about 39.8 mol % of BaO, about 7 mol % to about 12 mol % of $SiO_2$, about 29.3 mol % to about 34.3 mol % of $B_2O_3$, about 2.5 mol % to about 7.5 mol % of $ZnO_2$, about 8.8 mol % to about 13.8 mol % of CaO, and about 2.5 mol % to about 7.5 mol % of $Al_2O_3$, or about 36.3 mol % to about 38.3 mol % of BaO, about 8.5 mol % to about 10.5 mol % of $SiO_2$, about 30.8 mol % to about 32.8 mol % of $B_2O_3$, about 4 mol % to about 6 mol % of $ZnO_2$, about 10.3 mol % to about 12.3 mol % of CaO, and about 4 mol % to about 6 mol % of $Al_2O_3$.

Alternatively, the glass frits may include a first glass frit and a second glass frit in a volume ratio of about 1:0.1 to about 1:100, for example about 1:0.1 to about 1:50, about 1:0.1 to about 1:10, or about 1:1 to about 1:5. In addition, the glass frit may not include SrO.

In addition, the paste for the first layer may optionally include a subcomponent such as a binder, a solvent, a dispersant, a plasticizer, or oxide powder, and the like. For example, the binder may include ethyl cellulose, acryl, butyral, or the like, and the solvent may use an organic solvent such as terpineol, butyl carbitol, alcohol, methylethylketone, acetone, or toluene, or an aqueous solvent.

A method of coating the paste for the first layer on the outer surface of the capacitor body may include various printing methods such as a dip method, or screen printing, and the like, a coating method by using a dispenser, a spray method by using a spray, and the like. The paste for the first layer may be coated on at least the third and fourth surfaces of the capacitor body and optionally, on a portion of the first surface, the second surface, the fifth surface, or the sixth surface where the external electrode is formed.

Then, the capacitor body on which the paste for the first layer is coated is dried and sintered at a temperature of in a range from about 700° C. to about 1000° C. for about 0.1 hour to about 3 hours to form the first layer. As described above, the glass portion having an extension portion may also be formed at this time.

Optionally, on the outer surface of the obtained capacitor body, a paste for a second layer is coated and cured, forming a second layer.

The paste for the second layer may include a resin and optionally, a conductive metal or a non-conductive filler. The conductive metal and the resin are the same as described above and will not be repeated illustrated again. In addition, the paste for the second layer may optionally include a subcomponent such as a binder, a solvent, a dispersant, a plasticizer, or oxide powder, and the like. For example, the binder may include ethyl cellulose, acryl, butyral, or the like, and the solvent may use an organic solvent such as terpineol, butyl carbitol, alcohol, methylethylketone, acetone, or toluene, or an aqueous solvent.

For example, a method of forming the second layer may include dipping the capacitor body 110 into the paste for the second layer to form the second layer and curing it, screen-printing or gravure-printing the paste for the second layer on the surface of the capacitor body 110, or coating the paste for the second layer and then curing it.

Subsequently, a third layer is formed outside the first layer or the second layer.

For example, the third layer may be formed by a plating method, or may be formed by sputtering or electroplating (electric deposition).

Hereinafter, specific embodiments of the invention are presented. However, the examples described below are only for specifically illustrating or explaining the invention, and the scope of the invention is not limited thereto.

Preparation Examples: Manufacturing of Multilayered Capacitor

A paste containing barium titanite ($BaTiO_3$) powder is coated on a carrier film and dried to prepare a plurality of dielectric green sheets. Herein, the ceramic raw material includes Tb as a subcomponent.

A conductive paste including nickel (Ni) is screen-printed on each dielectric green sheet to form a conductive paste layer.

A dielectric green sheet stack is manufactured by stacking the plurality of dielectric green sheets, while at least each portion of the conductive paste layers thereon is overlapped.

The dielectric green sheet stack is cut into individual chips, which are maintained under an air atmosphere at 230° C. for 60 hours to remove a binder and then fired at 1200° C., manufacturing a capacitor body.

Subsequently, a conductive paste including a glass frit and copper (Cu) as a conductive metal is dip-coated on the outer surface of the capacitor body and dried. The capacitor body coated with the conductive paste is maintained at 735° C., 760° C., 800° C., 830° C., and 860° ° C. for 0.5 hour, respectively to form a first layer.

In addition, on the first layer, a nickel (Ni) plating electrode layer is formed, manufacturing a multilayered capacitor.

Herein, each multilayered capacitor according to Comparative Example 1 and Examples 1 to 3 is manufactured by changing a type of the glass frit used to form the first layer. Comparative Example 1 uses B-275, which is commercially available as a glass frit, but Example 1 uses Glass frit 1 in Table 1, Example 2 uses Glass frit 2 shown in Table 1, and Example 3 uses a glass frit mixture of Glass frit 1 and Glass frit 2 in a volume ratio of 1.95:7.55.

TABLE 1

| | Ts (° C.) | Twet (° C.) | Composition (wt %) | | | | | | |
|---|---|---|---|---|---|---|---|---|---|
| | | | BaO | SiO$_2$ | B$_2$O$_3$ | ZnO$_2$ | CaO | Al$_2$O$_3$ | Total |
| Glass frit 1 | 630 | 730 | 28.2 | 7.2 | 24.0 | 28.3 | 8.6 | 3.8 | 100 |
| Glass frit 2 | 633 | 769 | 37.3 | 9.5 | 31.8 | 5.0 | 11.3 | 5.0 | 100 |

Experimental Results

Experimental Example 1: Characteristic Analysis of Glass Frit

Figure 5:
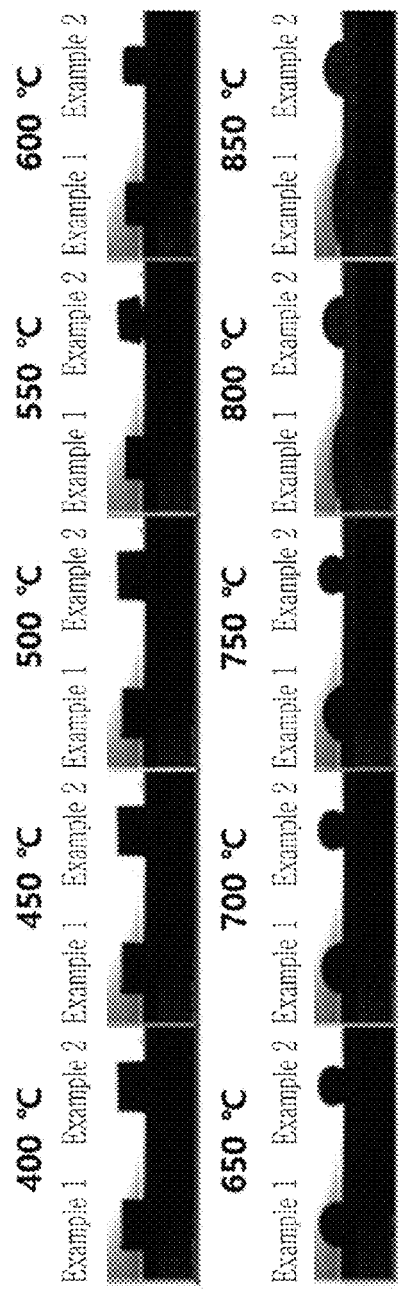
FIG. 5 shows photographs showing the results of measuring the contact angles of the glass frits used in Examples 1 and 2 to an alumina ($Al_2O_3$) substrate as a function of temperature.

Glass frit 1 and Glass frit 2 used in Example 1 and Example 2 are measured with respect to a contact angle for an alumina (Al$_2$O$_3$) substrate at 400° ° C., 450° C., 500° C., 550° C., 600° C., 650° C., 700° C., 750° C., 800° C., and 850° C., and the results are shown in FIG. 5.

In addition, after polishing the L-axis direction and T-axis direction surface (e.g., fifth surface) of the multilayered capacitors according to Comparative Example 1 and Examples 1 to 3 to a depth of about ½ along the W-axis direction, on the exposed cut surfaces, each sample is prepared by ion-milling a connection portion of a dielectric layer and an internal electrode with an external electrode. In a band portion of each prepared sample, a boundary between the external electrode and the capacitor body is examined by using SEM and component-analyzed by using EDS, and the results are shown in FIGS. 6 and 7.

Figure 6:
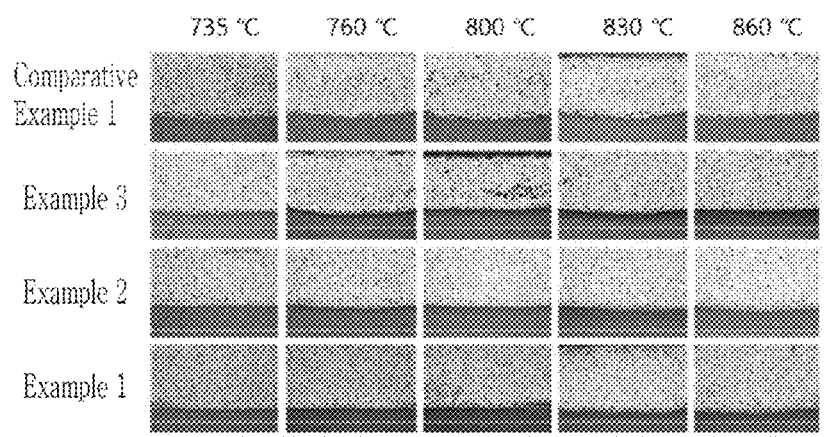
FIG. 6 shows photographs showing the results of measuring the diffusion lengths according to the firing temperatures for the glass frits used in Comparative Example 1 and Examples 1 to 3.
Figure 7:
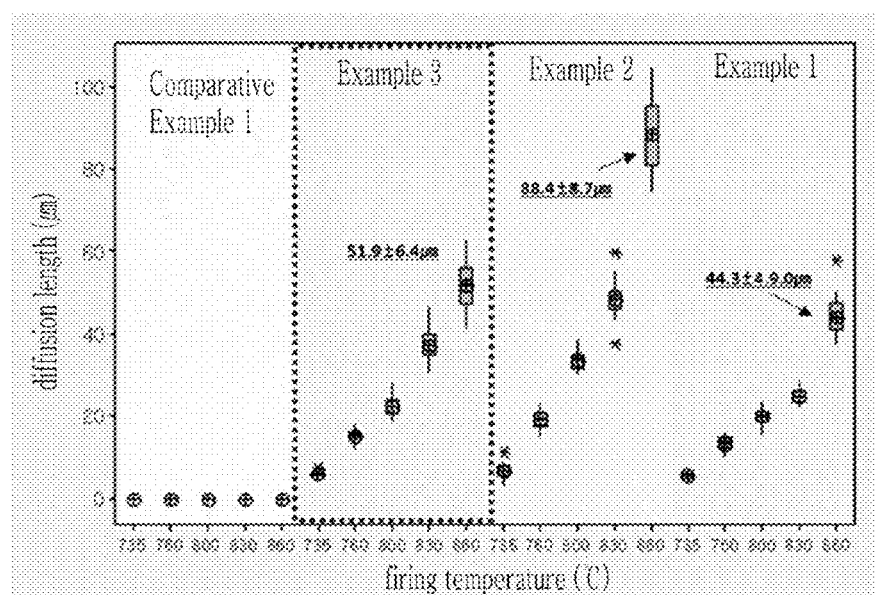
FIG. 7 is a graph showing the results of measuring the diffusion lengths according to the firing temperatures for the glass frits used in Comparative Example 1 and Examples 1 to 3.

In FIGS. 6 and 7, a diffusion length of each used glass frit is checked at a firing temperature of 735° C., 760° C., 800° C., 830° C., and 860° C.

Referring to FIGS. 5 to 7, when Si in a high content is included in the glass frits, a bonding force of glass itself is improved, and surface tension thereof is increased, reducing wetting to copper and thus lowering density.

In addition, when Ba in a high content is included in the glass frits, fluidity of glass is increased, and interface tension between glass and copper is reduced, increasing wetting to the copper and thus increasing density.

In addition, Zn helps to produce a network of the glass, reducing viscosity of the glass frit and improving the wetting.

Furthermore, when the glass frits include Si and Zn, a sintering temperature of the conductive pastes may be effectively lowered.

Experimental Example 2: Characteristic Analysis of Multilayered Capacitor

The multilayered capacitors according to Example 3 and Comparative Example 1 are measured with respect to coverage and moisture resistance and examined with a scanning electron microscope (SEM), and the results are respectively shown in FIGS. 8 to 11.

In FIGS. 8 to 11, Comparative Examples 1-1 and 1-2 use the same glass frit in the first layers, but the first layers have a different thickness. The first layer of Comparative Example 1-1 has a thickness of 32.4±3.6 µm, and the first layer of Comparative Example 1-2 has a thickness of 58.9±4.7 µm.

On the cut surfaces exposed by polishing the L-axis direction and T-axis direction surface (e.g., fifth surface) of the multilayered capacitors of Example 3 and Comparative Examples 1-1 and 1-2 along the W-axis direction to a depth of about ½, each sample is prepared by ion-milling a connection portion of a dielectric layer and an internal electrode with an external electrode. The prepared samples are examined by using SEM and component-analyzed by using EDS.

A coverage is measured by measuring an area % of a conductive metal in the first layer at the corner where the first and second surfaces meet the third and fourth surfaces.

Figure 8:
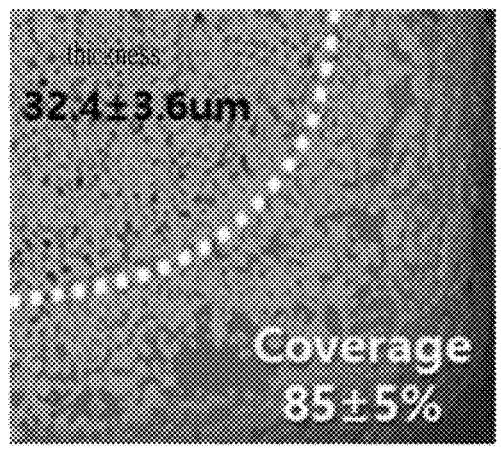
FIG. 8 is a photograph illustrating the coverage measurement results of the multilayered capacitors manufactured in Comparative Example 1-1.
Figure 9:
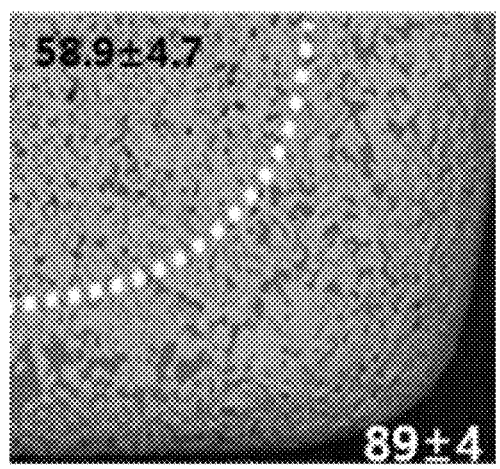
FIG. 9 is a photograph illustrating the coverage measurement results of the multilayered capacitors manufactured in Comparative Example 1-2.

FIG. 8 is a photograph illustrating the coverage measurement result of the multilayered capacitor manufactured in Comparative Example 1-1. In FIG. 8, 32.4±3.6 µm is a thickness of the first layer, and 85±5% is the coverage. FIG. 9 is a photograph illustrating the coverage measurement result of the multilayered capacitor manufactured in Comparative Example 1-2. In FIG. 9, 58.9±4.7 µm is a thickness of the first layer, and 89±4% is the coverage.

Figure 10:
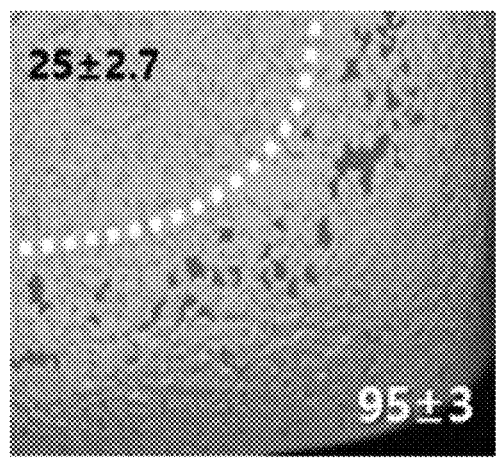
FIG. 10 is a photograph illustrating the coverage measurement results of the multilayered capacitors manufactured in Example 3.

FIG. 10 is a photograph illustrating the coverage measurement result of the multilayered capacitor manufactured in Example 3. In FIG. 10, 25±2.7 µm is a thickness of the first layer, and 95±3% is the coverage.

Referring to FIGS. 8 to 10, the multilayered capacitors of Comparative Example 1-1 and 1-2 exhibit not much improved corner coverage, when the thickness of the first layer is increased, but the multilayered capacitor of Example 3 exhibits excellent coverage, even though the first layer has a small thickness of 25±2.7 µm.

A moisture resistance failure rate is measured by applying an appropriate voltage at a specific temperature (85° C.) under specific humidity (85%) to evaluate insulation resistance changes in the 8585 test.

As a result of measuring the moisture resistance failure rate of the multilayered capacitor of Comparative Example 1-1, the multilayered capacitor of Comparative Example 1-1 exhibits a failure rate of 2133 ppm and the failure number of 24 pcs out of the evaluation number of 11,250.

As a result of measuring the moisture resistance failure rate of the multilayered capacitor of Comparative Example 1-2, the multilayered capacitor of Comparative Example 1-2 exhibits a failure rate of 622 ppm and the failure number of 7 pcs out of the evaluation number of 11,250.

As a result of measuring the moisture resistance failure rate of the multilayered capacitor of Example 3, the multilayered capacitor of Example 3 exhibits a failure rate of 0 ppm and the failure number of 0 pcs out of the evaluation number of 11,250.

In other words, the multilayered capacitor of Example 3 exhibits excellent moisture resistance characteristics, compared with the multilayered capacitors according to Comparative Examples 1-1 and 1-2.

Figure 11:
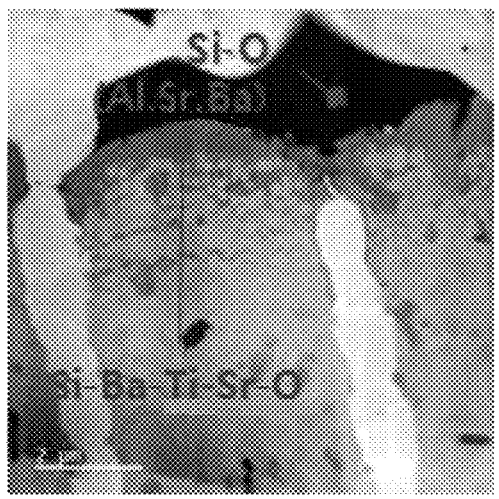
FIG. 11 is a scanning electron micrograph (SEM) of the multilayered capacitor manufactured in Comparative Example 1-1.

FIG. 11 is a scanning electron micrograph (SEM) of the multilayered capacitor manufactured in Comparative Example 1-1.

Figure 12:
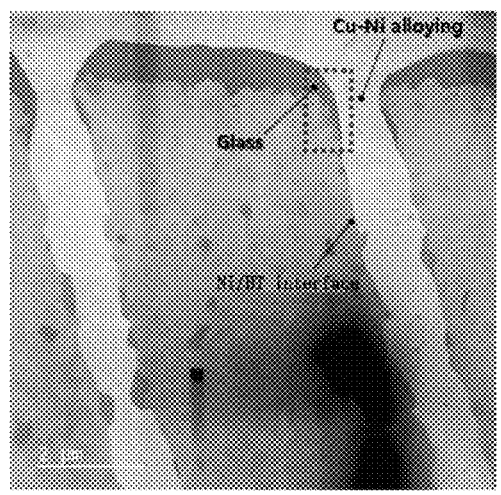
FIG. 12 is a scanning electron micrograph (SEM) of the multilayered capacitor manufactured in Comparative Example 3.

FIG. 12 is a scanning electron micrograph (SEM) of the multilayered capacitor manufactured in Comparative Example 3.

Referring to FIGS. 11 and 12, the multilayered capacitor of Example 3 includes a glass portion disposed where the first layer meets the dielectric layer, wherein the glass portion has an extended portion extending into the capacitor body along a gap between the dielectric layer and the internal electrode. In addition, the multilayered capacitor of Example 3 includes a first alloy portion where the internal electrode meets the first layer.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

DESCRIPTION OF SYMBOLS

100: multilayered capacitor
110: capacitor body
111: dielectric layer
111a: glass diffusion region
112, 113: cover region
121: first internal electrode
122: second internal electrode
122a: first alloy portion
131: first external electrode
132: second external electrode
1321: first layer
1321a: conductive metal
1321b: glass frit
133: glass portion
133a: extended portion

What is claimed is:

1. A multilayered capacitor, comprising:
a capacitor body including a dielectric layer and an internal electrode; and
an external electrode outside the capacitor body, the external electrode comprising a first layer including a conductive metal and glass disposed outside the capacitor body,
wherein, at an interface with the dielectric layer, the first layer includes a glass portion, and
the glass portion includes glass and has an extended portion extending into the capacitor body along a gap between the dielectric layer and the internal electrode.

2. The multilayered capacitor of claim 1, wherein, at an interface with the first layer, the internal electrode includes a first alloy portion including an alloy.

3. The multilayered capacitor of claim 2, wherein, at an interface with the internal electrode, the first layer does not include the glass portion.

4. The multilayered capacitor of claim 2, wherein the alloy of the conductive metal included in the first layer and a metal included in the internal electrode.

5. The multilayered capacitor of claim 4, wherein the conductive metal includes copper (Cu) and the metal included in the internal electrode includes nickel (Ni).

6. The multilayered capacitor of claim 2, wherein the extended portion of the glass portion is disposed between the first alloy portion and the dielectric layer.

7. The multilayered capacitor of claim 2, wherein the dielectric layer includes a glass diffusion region in which glass is diffused into the dielectric layer.

8. The multilayered capacitor of claim 7, wherein the extended portion of the glass portion is disposed between the first alloy portion and the glass diffusion region of the dielectric layer.

9. The multilayered capacitor of claim 1, wherein, at an interface with the internal electrode, the first layer includes a second alloy portion including an alloy.

10. The multilayered capacitor of claim 9, wherein the second alloy portion is disposed between the glass portion and another adjacent glass portion.

11. The multilayered capacitor of claim 1, wherein the glass portion covers an end of the dielectric layer.

12. The multilayered capacitor of claim 1, wherein the glass includes an oxide including barium (Ba), silicon (Si), boron (B), zinc (Zn), calcium (Ca), and aluminum (Al).

13. The multilayered capacitor of claim 12, wherein, in the glass, a weight ratio of barium (Ba) (wt % of barium (Ba) to the total weight of the glass) is greater than a weight ratio of silicon (Si) (wt % of silicon (Si) to the total weight of the glass).

14. The multilayered capacitor of claim 13, wherein, in the glass, the weight ratio of barium (Ba) is more than twice the weight ratio of silicon (Si).

15. The multilayered capacitor of claim 1, wherein the dielectric layer includes greater than or equal to about 0.2 mol and less than about 1 mol of Tb based on 100 mol of $BaTiO_3$.

16. The multilayered capacitor of claim 1, wherein the external electrode further includes a second layer disposed outside the first layer, the second layer including a resin and a conductive metal.

17. The multilayered capacitor of claim 1, wherein the external electrode further includes a third layer disposed outside the first layer, the third layer including a plated metal.

18. A method of manufacturing a multilayered capacitor, comprising:
forming a conductive paste layer that becomes an internal electrode after firing, on the surface of a dielectric green sheet, which becomes a dielectric layer after firing;
stacking the dielectric green sheets on which the conductive paste layer is formed to form a dielectric green sheet stack;
firing the dielectric green sheet stack to manufacture a capacitor body; and
coating a conductive paste including a conductive metal and a glass frit on an external surface of the capacitor body and then sintering the resultant at about 700° ° C. to about 1000° ° C. to form an external electrode including a first layer,
wherein the first layer includes a glass portion disposed at an interface with the dielectric layer and including a glass frit, and
the glass portion has an extended portion extending into the capacitor body along an interface between the dielectric layer and the internal electrode.

19. The method of claim 18, wherein the glass frit is a first glass frit including about 23.2 mol % to about 33.2 mol % of BaO, about 2.2 mol % to about 12.2 mol % of $SiO_2$, about 19 mol % to about 29 mol % of $B_2O_3$, about 23.3 mol % to about 33.3 mol % of $ZnO_2$, about 3.6 mol % to about 13.6 mol % of CaO, and about 0 mol % to about 8.8 mol % of $Al_2O_3$.

20. The method of claim 18, wherein the glass frit is a second glass frit including about 32.3 mol % to about 42.3 mol % of BaO, about 4.5 mol % to about 14.5 mol % of $SiO_2$, about 26.8 mol % to about 36.8 mol % of $B_2O_3$, about 0 mol % to about 10 mol % of $ZnO_2$, about 6.3 mol % to about 16.3 mol % of CaO, and about 0 mol % to about 5 mol % of $Al_2O_3$.

21. A multilayer capacitor comprising:
a capacitor body including a dielectric layer and an internal electrode disposed on the dielectric layer;
an external electrode disposed on an external surface of the capacitor body that is substantially perpendicular to a plane of the dielectric layer, the external electrode comprising a first layer including a glass portion extending into the capacitor body at a portion of an interface between the internal electrode and the dielectric layer without being present at an interface between the first layer and the internal electrode.

22. The multilayer capacitor of claim 21, wherein the first layer further comprises a first alloy portion at an interface between the first layer and the internal electrode.

23. The multilayer capacitor of claim 21, wherein the glass portion is disposed at the interface between the first layer and the dielectric layer.

24. The multilayer capacitor of claim 21, wherein the glass portion comprises an oxide comprising a metal selected from the group consisting of barium (Ba), silicon (Si), boron (B), zinc (Zn), calcium (Ca), aluminum (Al), and a combination thereof.

25. The multilayer capacitor of claim 21, wherein the external electrode further comprises:
   a second layer disposed on the first layer, the second layer including a conductive metal and a resin; and
   a third layer disposed on the second layer and comprising a plating metal.

26. The multilayer capacitor of claim 21, wherein the external electrode extends to a portion of an external surface of the body substantially parallel to the plane of the dielectric layer.

* * * * *